United States Patent [19]

Shah

[11] 3,764,654

[45] Oct. 9, 1973

[54] MULTI-STAGE REMOVAL OF ENTRAINED SOLIDS AND SULFUR DIOXIDE FROM GAS STREAMS

[75] Inventor: Indravadan S. Shah, Forest Hills, N.Y.

[73] Assignee: Chemical Construction Corporation, New York, N.Y.

[22] Filed: Oct. 28, 1971

[21] Appl. No.: 193,465

[52] U.S. Cl. .............................. 423/242, 423/215
[51] Int. Cl. ............................................ C01b 17/00
[58] Field of Search ........................... 423/215, 242

[56] References Cited
UNITED STATES PATENTS
3,622,270 11/1971 Shah .................................. 423/242
3,653,823 4/1972 Shah .................................. 423/242

Primary Examiner—Edward J. Meros
Assistant Examiner—Gregory A. Heller
Attorney—J. L. Chaboty

[57] ABSTRACT

A method of scrubbing a gas stream in venturi passages with an aqueous solution or slurry, in order to remove entrained solids such as fly ash as well as sulfur dioxide. Two venturi passages in series are provided, with the gas stream flowing through both passages. A minor portion of scrubbing liquid passes to the first passage, and a high gas velocity above 30 meters per second is maintained in the first passage, so that most of the entrained solids pass into the liquid phase in the first venturi. The resulting gas-liquid mixture flows through the second venturi passage at low velocity below 30 meters per second, and a major portion of the scrubbing liquid is passed into the second venturi, so that a major portion or essentially all of the sulfur dioxide is removed from the gas stream in the second venturi passage.

8 Claims, 1 Drawing Figure

PATENTED OCT 9 1973 3,764,654
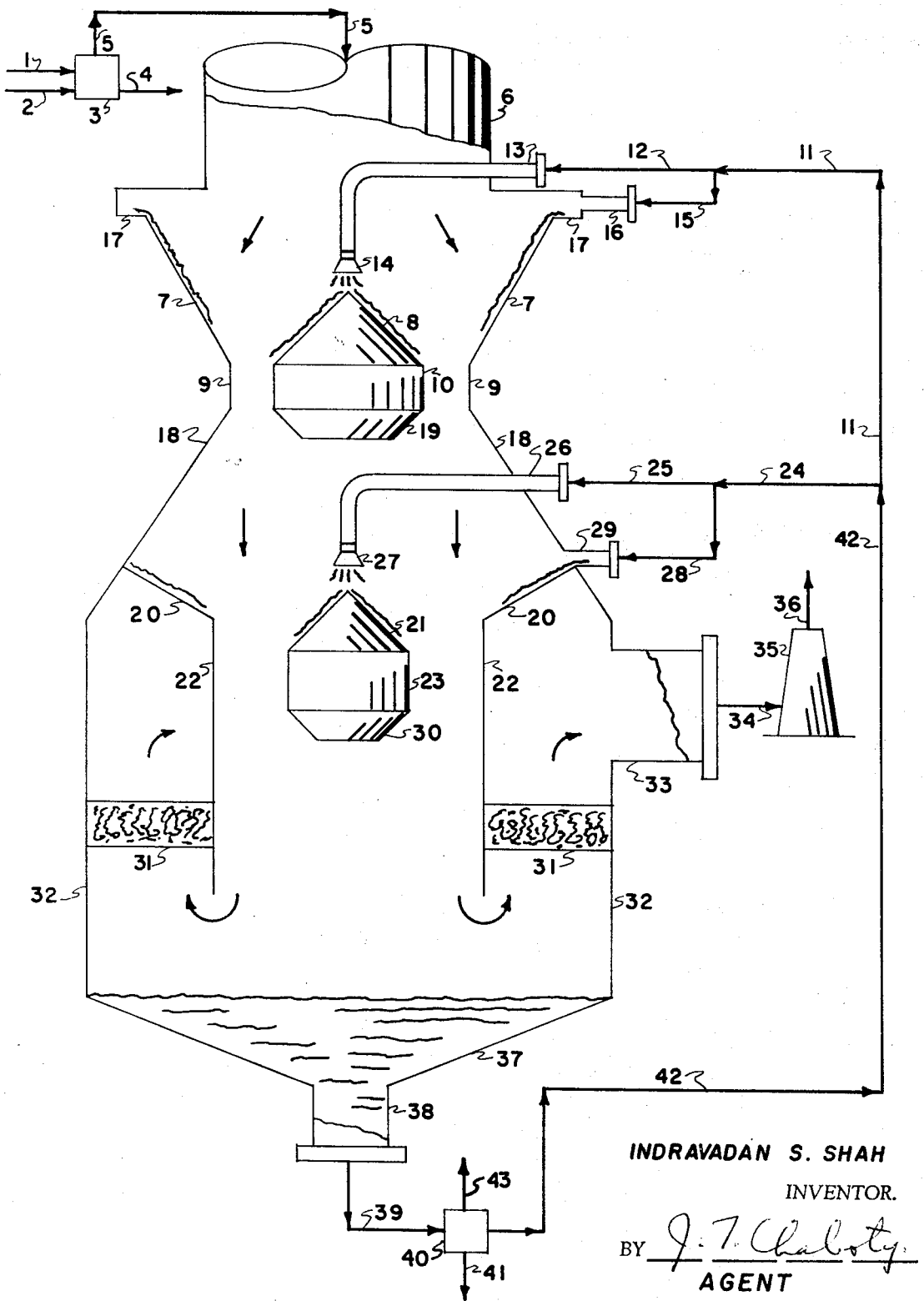
INDRAVADAN S. SHAH
INVENTOR.
BY J. T. Chaloty
AGENT

MULTI-STAGE REMOVAL OF ENTRAINED SOLIDS AND SULFUR DIOXIDE FROM GAS STREAMS

BACKGROUND OF THE INVENTION

1. Field of the Invention

The invention principally relates to the prevention of air pollution, by the scrubbing of a gas stream such as a waste stack or flue gas with an aqueous solution or slurry, so as to remove sulfur dioxide and entrained solid particles such as fly ash, prior to the discharge of the gas stream to the atmosphere. The invention is generally applicable to the scrubbing of any process or waste gas, so as to remove entrained solid particles and sulfur dioxide.

2. Description of the Prior Art

The scrubbing of gases using various types of aqueous alkaline scrubbing solutions or slurries, in a venturi-type contactor, in order to remove entrained solid particles and sulfur dioxide, is generally described in U. S. Pat. Nos. 3,533,748; 3,607,001; 3,577,219; 3,542,511; 3,600,131; 3,607,033 and allowed U. S. Pat. applications Nos. 737,186 filed June 14, 1968, now U.S. Pat. No. 3,617,212; 800,138 filed Feb. 18, 1969, now U.S. Pat. No. 3,632,306; 883,485 filed Dec. 9, 1969, now U.S. Pat. No. 3,650,692; and 14,948 filed Feb. 27, 1970, now U.S. Pat. No. 3,622,270 and U. S. Pat. application No. 14,947 filed Feb. 27, 1970, now U.S. Pat. No. 3,653,823. Various types and configurations of venturi scrubber apparatus are described in U. S. Pat. Nos. 3,085,793; 3,439,724; 3,317,197; 3,440,803; 3,544,086; 3,584,440 and 3,567,194; U. S. Pat. application No. 20,579 filed Mar. 18, 1970, now U.S. Pat. No. 3,690,044 and allowed U. S. Pat. application No. 843,444 filed July 22, 1969, now U.S. Pat. No. 3,638,925.

SUMMARY OF THE INVENTION

In the present invention, a two-stage method is provided for venturi scrubbing of gas streams with aqueous alkaline or acid solutions or slurries, in order to remove entrained solid particles and sulfur dioxide. In the first venturi stage, a low liquid to gas flow ratio is provided, together with high gas velocity in the venturi passage. This combination of conditions results in high removal from the gas stream of entrained solids such as fly ash. The resulting gas-liquid mixture is passed through the second venturi passage at relatively low velocity and a high liquid to gas flow ratio. This combination of conditions results in high removal of sulfur dioxide from the gas stream. The resulting scrubbed gas stream discharged from the second venturi passage is separated from the liquid or slurry phase, which now contains the entrained solid particles and sulfur dioxide removed from the gas stream. The scrubbed gas stream may be discharged to the atmosphere or otherwise suitably utilized, while the aqueous alkaline or acid scrubbing solution or slurry is regenerated by known means for solids removal and sulfur dioxide disposal or recovery, and recycled for further gas scrubbing. In other instances, the spent scrubbing solution may be discarded.

The principal advantage of the present invention is that entrained solid particles and sulfur dioxide are removed from a gas stream in a more effective and efficient manner, and more complete removal of these components from the gas stream is attained. Another advantage is that the overall pressure drop of the gas stream during scrubbing is reduced. A further advantage is that the aqueous alkaline or slightly acidic scrubbing solution is employed in a more efficient manner.

It is an object of the present invention to remove entrained solid particles and sulfur dioxide from gas streams in an improved manner.

Another object is to provide an improved method for the substantially complete removal of entrained solid particles and sulfur dioxide from a gas stream.

An additional object is to provide a method for scrubbing waste gases for particulates and sulfur dioxide removal in venturi passages with low gas pressure drop.

A further object is to provide an improved method for removing solid particles and sulfur dioxide from a gas stream using an aqueous alkaline or slightly acid scrubbing solution or slurry.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented, in which the gas scrubbing method is applied to the scrubbing of a flue gas generated by the combustion of a sulfur-containing fuel in a power plant. Fuel stream 1 consists of a sulfur-containing fuel, and stream 1 may be a solid carbonaceous fuel such as coal or a liquid hydrocarbon fuel such as crude oil or residual oil derived from petroleum refining, or any other type of sulfur-containing fuel. Stream 1 is burned with combustion air stream 2 in steam boiler or furnace 3, so as to generate steam which is passed to a steam turbine which drives an electric generator, not shown. Stream 1 contains ash-forming constituents, and a major portion of the generated solid ash is removed from unit 3 via stream 4.

The combustion of stream 1 also generates a flue gas stream 5, which contains entrained solid fly ash particles and sulfur dioxide derived from the oxidative combustion of stream 1. Stream 5 is passed downwards through the vertically oriented cylindrical conduit 6, and the flue gas flows downwards from the outlet of conduit 6 into a first vertically oriented annular venturi scrubber, defined by inverted frusto-conical baffle 7, central conical baffle 8, annular cylindrical baffle 9 dependent from baffle 7, and cylindrical baffle 10 dependent from the base of baffle 8, and the gas stream is accelerated in the first venturi passage to a high velocity above about 30 meters per second, and typically in the range of 30 to 50 meters per second, in the annular throat of the first venturi passage defined between baffles 9 and 10.

An aqueous alkaline or slightly acidic scrubbing liquid stream 11, derived in a manner to be described infra, is utilized in the first venturi passage to scrub the flue gas stream, so as to remove a major portion or essentially all of the fly ash from the gas phase. Stream 11 consists essentially of an aqueous alkaline or slightly acidic solution or slurry, and it will be understood that the term alkaline solution includes and encompasses an alkaline slurry which contains a solid phase consisting of discrete solid particles of a suitable alkaline component. Thus, stream 11 may in practice consist essentially of an aqueous alkaline solution per se, containing a dissolved active alkaline compound such as sodium hydroxide, sodium carbonate, potassium hydroxide, potassium carbonate, or ammonium hydroxide, or mixtures thereof. In other instances, stream 11 may be a slurry containing a dissolved active alkaline compound such as calcium hydroxide, calcium carbonate, magnesium hydroxide, magnesium oxide, magnesium carbonate, barium hydroxide or barium carbonate or mixtures thereof, together with entrained solid particles of the active alkaline compound. Stream 11 may alternatively be slightly acidic and contain sodium sulfite-bisulfite or the like.

A portion of stream 11 flows via stream 12 to pipe 13, which passes alkaline or slightly acidic solution to spray nozzle 14, which may be a bull nozzle or the like. Stream 12 is typically about 40 percent to 70 percent of stream 11, with stream 12 being a major portion such as 60 percent of stream 11 in most instances. Nozzle 14 sprays stream 12 onto the apex of conical baffle 8, and the sprayed liquid flows downwards on the surface of baffle 8 and is projected into the high velocity gas stream in the annular throat of the first venturi passage defined between concentric cylindrical baffles 9 and 10.

The balance of stream 11 flows via stream 15 into one or a plurality of pipes 16, which may be disposed substantially tangential to baffle 7. Stream 15 flows from pipe 16 onto liquid distribution shelf 17 disposed at the upper end of baffle 7, and shelf 17 may be provided with a circular weir or the like, not shown, to assure uniform liquid distribution. The liquid stream flows from shelf 17 downwards on the inner surface of baffle 7, and in instances when the pipe or pipes 16 are tangential to baffle 7, the downflowing liquid on baffle 7 will flow downwards in a whirling circular or cyclonic flow path. The downflowing liquid on baffle 7 is projected into the high velocity gas stream in the annular throat of the first venturi passage defined between baffles 9 and 10, and the projection of scrubbing liquid into this annular throat from the lower ends of baffles 8 and 7 serves to remove a major portion or essentially all of the fly ash from the gas stream. In addition, a portion of the sulfur dioxide will be removed from the gas stream. A relatively low overall liquid to gas ratio typically in the range of about 1.3 to 2 liters of total scrubbing liquid per actual cubic meter of gas is maintained in the first venturi passage.

The resulting gas-liquid mixture discharged downwards from the throat section of the first venturi passage now contains a gaseous phase essentially devoid of fly ash but still containing a substantial proportion of unabsorbed sulfur dioxide, and a liquid droplets phase containing entrained fly ash as well as dissolved and combined sulfur dioxide. The resulting gas-liquid mixture flowing downwards from the annular throat defined between baffles 10 and 9 initially preferably passes through a diverging venturi section for pressure regain. The diverging venturi section is defined between frusto-conical baffle 18 which depends from baffle 9, and inverted frusto-conical baffle 19 which depends from baffle 10. The gas-liquid mixture thus discharged from the first venturi passage now flows downwards into a second vertically oriented annular venturi scrubber for removal of residual sulfur dioxide from the gas phase. The second annular venturi scrubber is defined by inverted frusto-conical baffle 20, central conical baffle 21, annular cylindrical baffle 22 dependent from baffle 20, and cylindrical baffle 23 dependent from the base of baffle 21, and the gas-liquid mixture is accelerated in the second venturi passage to a relatively low velocity, below the velocity of the gas stream in the first venturi passage and below about 30 meters per second, and typically in the range of 20 to 30 meters per second, in the annular throat of the second venturi passage defined between baffles 22 and 23.

An aqueous alkaline or slightly acidic scrubbing liquid stream 24, which generally has a composition identical to that of stream 11 described supra, is utilized in the second venturi passage to scrub the gas stream, so as to remove most or essentially all of the sulfur dioxide from the gas phase. A portion of stream 24 flows via stream 25 to pipe 26, which passes alkaline solution to spray nozzle 27, which may be a bull nozzle or the like. Stream 25 is typically about 40 percent to 70 percent of stream 24, with stream 25 being a major portion such as 60 percent of stream 24 in most instances. Nozzle 27 sprays stream 25 onto the apex of conical baffle 21, and the sprayed liquid flows downwards on the surface of baffle 21 and is projected into the high velocity gas stream in the annular throat of the second venturi passage defined between concentric cylindrical baffles 22 and 23.

The balance of stream 24 flows via stream 28 into one or a plurality of pipes 29, which may be disposed substantially tangential to baffle 20. A shelf or weir, not shown, may be provided at the junction of units 29 and 20 for uniform liquid distribution, in a manner similar to shelf 17 described supra. The liquid stream flows from pipe 29 downwards on the inner surface of baffle 20, and in instances when the pipe or pipes 29 are tangential to baffle 20, the downflowing liquid on baffle 20 will flow downwards in a whirling circular or cyclonic flow path. The downflowing liquid on baffle 20 is projected into the high velocity gas stream in the annular throat of the second venturi passage defined between baffles 23 and 22, and the projection of scrubbing liquid into this annular throat from the lower ends of baffles 21 and 20, at relatively low gas velocity and relatively high liquid to gas ratio, serves to remove most or essentially all of the sulfur dioxide from the gas stream. A relatively high overall liquid to gas ratio typically in the range of about 4 to 6 liters of scrubbing liquid per actual cubic meter of gas is maintained in the second venturi passage.

The resulting gas-liquid mixture discharged downwards from the throat section of the second venturi passage now contains a gaseous phase essentially devoid of fly ash and sulfur dioxide, and a liquid droplets phase containing entrained fly ash as well as dissolved and combined sulfur dioxide. The resulting gas-liquid mixture flowing downwards from the annular throat defined between baffles 23 and 22 initially preferably passes through a diverging venturi section for pressure regain. The diverging venturi section is defined between baffle 22 and inverted frusto-conical baffle 30 which depends from baffle 23. The gas-liquid mixture thus discharged from the second venturi passage is now separated into separate scrubbed gas and scrubbing liquid phases, by reversing the flow path of the mixture below baffle 22, so that the gas phase flows outwards and upwards external to baffle 22.

The separated liquid phase collects in the bottom of the apparatus, while the upflowing scrubbed gas phase external to baffle 22 flows upwards through entrainment separator 31, which consists of a bed of wire mesh in this embodiment of the apparatus. In other instances, unit 31 may consist of a bed of spherical, ring-shaped or saddles packing, a plurality of staggered slats or baffles, or any suitable apparatus or device for separating entrained liquid droplets from a gas stream. In any case, unit 31 extends between baffle 22 and outer cylindrical baffle 32, and residual liquid droplets are separated from the scrubbed gas stream by unit 31. The liquid-free scrubbed gas stream rising above unit 31 flows laterally through conduit 33 and passes via stream 34 to stack 35 for discharge to the atmosphere via stream 36.

Returning to baffle 32, an inverted conical baffle 37 extends downwards from baffle 32, and the scrubbing liquid laden with dissolved and combined sulfur dioxide as well as fly ash collects on and above baffle 37. The baffle 37 may alternatively be disc-shaped or of any suitable configuration. The spent scrubbing liquid is removed from above baffle 37 via central nozzle 38 as stream 39, which is now preferably subjected to regeneration in unit 40 by filtration, heating and/or the like, or by any of the expedients described in the U. S. Pats. and applications mentioned supra, or by other methods known to the art. In any case, separated fly ash is discharged from unit 40 via stream 41 and regenerated aqueous solution or slurry stream 42 is also discharged from unit 40 for recycle to the scrubbing system. Separated sulfur dioxide is removed from unit 40 via stream 43, which usually consists of a sulfur dioxide-rich gas stream, which may be cooled to condense product liquid sulfur dioxide, or stream 43 may be passed to a sulfuric acid production facility for conversion to sulfuric acid. In other instances, stream 43 may consist of a sulfite which may be oxidized to a sulfate for product sales or utilized per se for any desired purpose. These alternatives are more fully discussed in the U. S. Patents and Applications mentioned supra.

Returning to recycle stream 42, which now consists of regenerated aqueous solution or slurry, stream 42 is divided into streams 11 and 24, with stream 11 generally consisting of a minor portion or less than one-half of stream 42. Stream 11 will usually consist of about 20 percent to 45 percent of stream 42, depending on individual operating parameters encountered in any specific operating facility.

Numerous alternatives within the scope of the present invention will occur to those skilled in the art. Stream 5 may be derived from any source which generates a gaseous stream containing entrained solid particles and sulfur dioxide. Thus, stream 5 may be a smelter off-gas, a gas stream generated by combustion of sludge acid or the calcining of gypsum, or a process gas stream in a chemical or metallurgical process. The first and second venturi passages may be arranged in any series arrangement and may be juxtaposed in the same horizontal plane or elevation. In any case, the first and/or the second venturi passages may be of any venturi-type configuration such as the venturis described in the U. S. Patents and applications mentioned supra. Thus, the central conical baffles 8 and/or 21 may be omitted in some instances, as well as the associated baffles 10 and 19 and/or 23 and 30. In this case, streams 12 or 15 may be omitted, and likewise streams 25 or 28 may be omitted. Streams 11 or 24 may be derived as a portion of stream 39 which bypasses unit 40. In another alternative, a portion of stream 39 may bypass unit 40, with the bypassed portion of stream 39 being added to stream 42. Finally, the first and second venturi passages may be horizontally oriented with transverse injection of stream 15 and/or stream 28 at the throat of the respective venturi passage.

An example of application of the method of the present invention to an industrial facility will now be described.

EXAMPLE

In an actual installation design, stream 5 was 8,350 actual cubic meters per minute of flue gas at 125° C. Stream 5 contained 28.3 kg. per minute of sulfur dioxide and 75.5 kg. per minute of fly ash. Throat velocity in the first venturi passage was 43 meters per second and stream 11 was an alkaline scrubbing slurry containing magnesium sulfite, oxide and hydroxide. Flow rate of stream 11 was 20,400 liters per minute. Throat velocity in the second venturi passage was 21 meters per second and the flow rate of stream 24 was 40,800 liters per minute. Stream 34 flow rate was 7610 actual cubic meters of scrubbed gas at 47° C, and stream 34 contained 1.42 kg. per minute of sulfur dioxide and 0.39 kg. per minute of fly ash.

I claim:

1. A method for scrubbing a gas stream to remove entrained solid particles and sulfur dioxide which comprises dividing an aqueous scrubbing solution containing a dissolved compound which is active for the absorption of sulfur dioxide into two portions of unequal magnitude so as to form a minor portion and a major portion, scrubbing a gas stream containing entrained solid particles and sulfur dioxide with said minor portion of scrubbing solution in a first venturi passage, said gas stream flowing through said first venturi passage at a high velocity above 30 meters per second, whereby a liquid to gas ratio in the range of about 1.3 to 2 liters of scrubbing liquid per actual cubic meter of gas is maintained in said first venturi passage and a major portion of said solid particles are removed from said gas stream and entrained in said minor solution portion, scrubbing the resulting gas-liquid mixture discharged from said first venturi passage with said major portion of scrubbing solution in a second venturi passage, said gas-liquid mixture flowing through said second venturi passage at a low velocity below 30 meters per second, whereby a liquid to gas ratio in the range of about 4 to 6 liters of scrubbing liquid per actual cubic meter of gas is maintained in said second venturi passage and sulfur dioxide is dissolved from the gas stream into the liquid phase, and separating the resulting scrubbed gas stream from the resulting aqueous scrubbing solution containing solid particles and dissolved sulfur dioxide.

2. The method of claim 1, in which said gas stream is a stack gas derived from the combustion of a sulfur-containing fuel, and said entrained solid particles are fly ash.

3. The method of claim 1, in which said aqueous scrubbing solution contains a dissolved active alkaline compound selected from the group consisting of sodium hydroxide, sodium carbonate, potassium hydroxide, potassium carbonate and ammonium hydroxide.

4. The method of claim 1, in which said aqueous scrubbing solution contains a dissolved active alkaline compound selected from the group consisting of calcium hydroxide, calcium carbonate, magnesium hydroxide, magnesium oxide, magnesium carbonate, barium hydroxide, and barium carbonate, and entrained solid particles of said active alkaline compound.

5. The method of claim 1, in which the velocity of said gas stream flowing through said first venturi passage is in the range of above 30 to 50 meters per second, and the velocity of said gas stream flowing through said second venturi passage is in the range of 20 to below 30 meters per second.

6. The method of claim 1, in which said first venturi passage is an annular venturi passage provided with a first central conical baffle and said second venturi passage is an annular venturi passage provided with a second central conical baffle.

7. The method of claim 6, in which part of said minor scrubbing solution portion is passed onto the apex of said first conical baffle, the balance of said minor scrubbing solution portion is passed downwards on the inner surface of the converging section of said first venturi passage, part of said major scrubbing solution portion is passed onto the apex of said second conical baffle, and the balance of said major scrubbing solution portion is passed downwards on the inner surface of the converging section of said second venturi passage.

8. The method of claim 1, in which said second venturi passage is disposed below said first venturi passage.

* * * * *